United States Patent [19]

Fremy

[11] Patent Number: 4,664,149
[45] Date of Patent: May 12, 1987

[54] AUTOMATICALLY-OPERATED SELF-SEALING ZERO-SPILLAGE FLUID COUPLING DEVICE

[76] Inventor: Raoul Fremy, Villa Emilia, 17 Rue Cecile Vallet, 93240 Bourg La Reine, France

[21] Appl. No.: 835,932

[22] Filed: Mar. 4, 1986

[30] Foreign Application Priority Data

May 10, 1985 [FR] France .................. 85 07102

[51] Int. Cl.⁴ ........................................... F16L 37/28
[52] U.S. Cl. ........................ 137/614.06; 137/614.01; 137/614.05
[58] Field of Search .................. 285/316; 137/614.02, 137/614.03, 614.05, 614.06, 614.01; 251/149.2, 149.6

[56] References Cited

U.S. PATENT DOCUMENTS

| | | | |
|---|---|---|---|
| Re. 27,364 | 5/1972 | German | 285/316 |
| 2,440,946 | 5/1948 | Hansen | 137/614.06 |
| 2,824,755 | 2/1958 | Lamphear | 251/149.2 |
| 3,078,068 | 2/1963 | Romney | 137/614.03 |
| 3,159,180 | 12/1964 | Courdot et al. | 137/614.06 |
| 4,181,149 | 1/1980 | Cox | 251/149.2 |
| 4,438,779 | 3/1984 | Allread | 137/614.06 |
| 4,473,211 | 9/1984 | Fremy | 251/149.2 |

*Primary Examiner*—A. Michael Chambers
*Attorney, Agent, or Firm*—Sommer & Sommer

[57] ABSTRACT

A fluid coupling device have separable male and female sections. Each section has a ball valve mounted for rotational and axial movement relative to a housing. When the sections are joined together, each ball valve rotates automatically to a flow-permitting position. When the sections are separated, each ball valve rotates automatically to a flow-preventing position. The ball valves interfit with one another so that a minimum volume of fluid is lost when the sections are separated.

18 Claims, 10 Drawing Figures

AUTOMATICALLY-OPERATED SELF-SEALING ZERO-SPILLAGE FLUID COUPLING DEVICE

BACKGROUND OF THE INVENTION

1. Field of the Invention

The present invention relates generally to the field of fluid coupling devices having separable first and second (e.g., male and female) sections, and, more particularly, to an improved automatically-operated self-sealing zero-spillage fluid coupling device in which a pair of interfitting valve elements are rotated sequentially from flow-preventing positions to flow-permitting positions upon relative movemt of one section toward the other (e.g., axially).

2. Description of the Prior Art

Fluid coupling devices are, of course, broadly known. It is also known to provide such coupling devices with a quick-disconnect mechanism to facilitate engagement and separation of the male section and the female section.

It is also known to provide such coupling devices with at least one rotary valve element that moves angularly from a flow-preventing position to a flow-permitting position upon axial insertion of one coupling section into the other, and vice versa. This type of couping device is called "self-sealing" because such valve elements automatically block the flow passage when the sections are separated from one another. Examples of such self-sealing coupling devices are shown in U.S. Pat. Nos. 4,473,211 (Fremy), 3,078,068 (Romney), 3,279,497 (Norton et al.), 4,181,149 (Cox), 2,948,553 (Gill et al.), 2,991,090 (DeCenzo), 3,382,892 (Cerbin), 3,921,656 (Meisenheimer et al.), 3,423,063 (German), 4,445,664 (Allread), 3,167,092 (Kelly et al.), 3,545,490 (Burrus) and 4,438,779 (Allread). However, in each of the foregoing references, the rotary valve elements were physically separated from one another when the male and female sections where joined together. This separation trapped a volume of fluid between the rotary valve elements, which fluid was spilled or lost when the sections were separated from one another.

It is also known to provide a "zero-spillage" coupling device. This type of device has two interfitting rotary valve elements, usually in the form of ball valves. One of the ball valves has a concave recess extending radially inwardly from its outer surface, which recess is adapted to receive a convex portin of the other ball valve when the sections are joined together. However, to establish a flow passage through the connected coupling device, it was necessary to rotate the ball valves sequentially. Specifically, that ball valve which did not have the convex recess was caused to first rotate from its flow-preventing position to its flow-permitting position, after which the ball valve with the recess could be caused to rotate to its flow-permitting position. Such interfitting ball valves, as well as the particular sequence of operation, are shown and described in U.S. Pat. Nos. 2,440,946 (Hansen), 2,376,803 (Mower et al.), 4,335,747 (Mitsumoto et al.) and 2,458,899 (Doubrava).

U.S. Pat. No. 3,159,180 (Courtot et al.) discloses a quick-disconnect fluid coupling device having separable male and female sections in combination with an interfitting "zero-spillage" rotating ball valve arrangement. However, this device required that the respective male and female coupling sections be first angularly oriented, and thereafter rotated relative to one another to effect the required sequence of valve element rotation.

SUMMARY OF THE INVENTION

The present invention broadly provides an improved self-sealing zero-spillage fluid coupling device which operates automatically in response to displacement of the two coupling sectios toward and away from one another.

With parenthetical reference to the first and second preferred embodiments, the improved device (e.g., 10 or 141) broadly includes: a first section (e.g., 11 or 142) having a first housing (e.g., 13 or 144) and having a first valve element (e.g., 15 or 146) operatively arranged therein for rotation relative thereto between a flow-preventing position and a flow-permitting position, this first valve element being biased toward its flow-preventing position; a second section (e.g., 12 or 143) having a second housing (e.g., 114 or 220) and having a second valve element (e.g., 116 or 222) operatively arranged therein for rotation relative thereto between a flow-preventing position and a flow-permitting position, this second valve element being biased toward its flow-preventing position; the two sections being selectively movable toward one another between successive first, second and third relative positions between the housings; one of the valve elements (e.g., 15 or 146) having a recess (e.g., 102) arranged to face the other of the valve elements (e.g, 116 or 222) when the housings are in the first relative position (e.g., as shown in FIGS. 2 or 6); the other of the valve elements having a portion arranged within this recess when the housings are in the first relative position; and a sequencing mechanism (e.g., 113,140 or 149,224) for causing the other valve element to rotate from its flow-preventing position to its flow-permitting position when the housings are moved from the first relative position (e.g., as shown in FIGS. 2 or 6) to the second relative position (e.g., as shown in FIGS. 3 or 8); and for causing the one valve element to rotate from its flow-preventing position to its flow-permitting position when the housings are further moved from the second relative position to the third relative position (e.g., as shown in FIGS. 4 or 9); whereby a full flow passage through the device will be established when the sections are in the third relative position.

In one embodiment, the sequencing mechanism may include a pair of springs exerting differential forces on the respective rotary valve elements, such that one element may be axially and rotationally displaced, prior to axial and rotational displacement of the other. In another embodiment, the sequencing mechanism may include one or more interlock mechanisms for positively preventing the other valve element from rotating until the one valve element has been rotated to its flow-permitting position.

Accordingly, the general object of the invention is to provide an improved fluid coupling device.

Another object is to provide an improved self-sealing zero-spillage fluid coupling device which is operated automatically on insertion of one coupling section into the other coupling section, and vice versa, and which does not require that one section be angularly oriented relative to the other prior to or during the coupling motion.

Still another object is to provide an improved automatically-operated self-sealing zero-spillage fluid coupling device of the quick-disconnect type.

These and other objects and advantages will become apparent from the foregoing and ongoing written specification, the drawings, and the appended claims.

DESCRIPTION OF THE PREFERRED EMBODIMENTS

Figure 1:
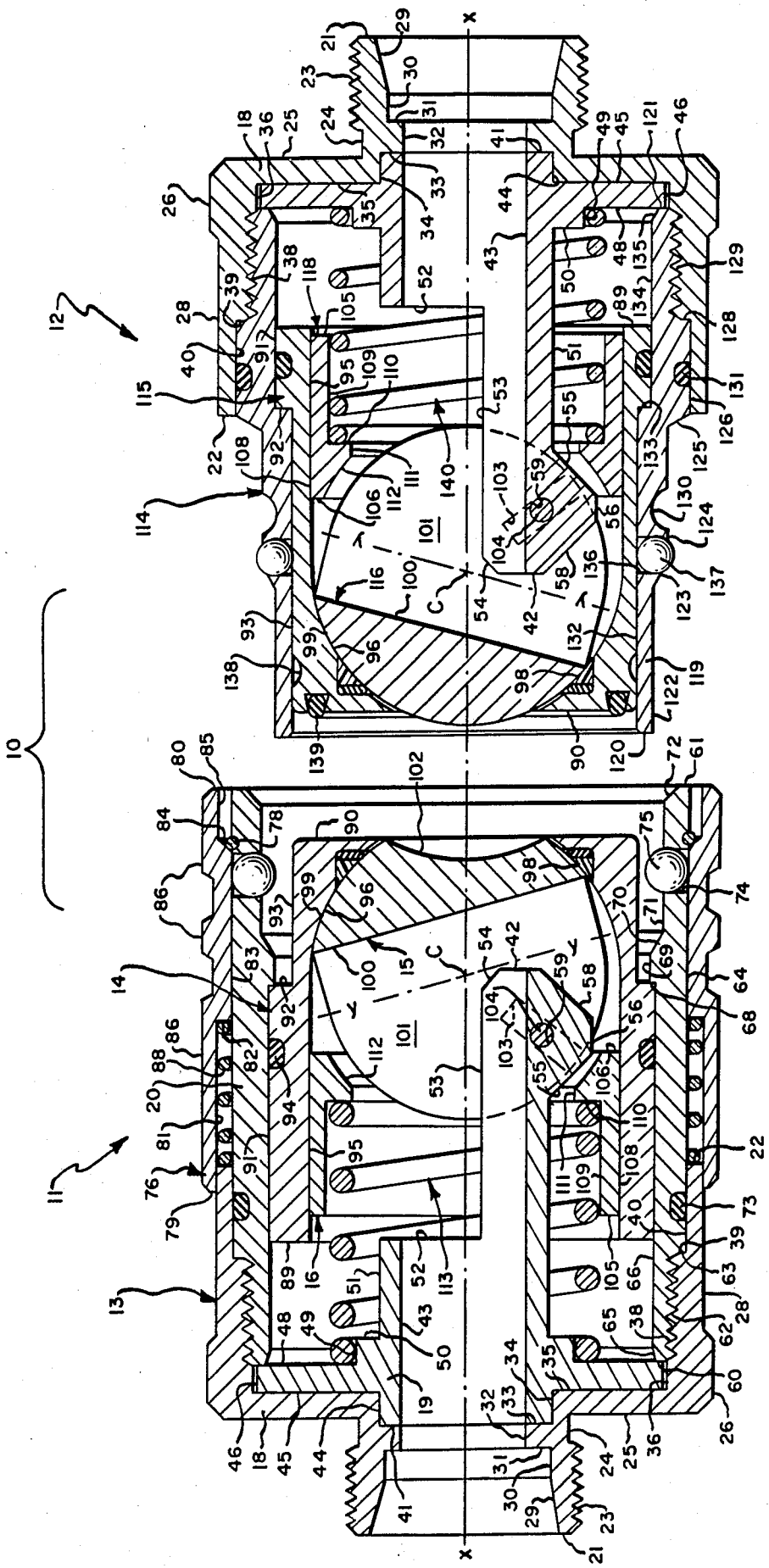
FIG. 1 is a fragmentary longitudinal vertical sectional view of a first embodiment of the improved fluid coupling device, this view showing the axially-aligned male and female sections as being separated from one another and showing the two valve elements as being in their flow-preventing positions.

At the outset, it should be clearly understood that like reference numerals are intended to identify the same structural elements, portions of surfaces consistently throughout the several drawing figures, as such elements, portions or surfaces may be further described or explained by the entire written specification, of which this detailed description is an integral part. The drawings are intended to be read (e.g., cross-hatching, proportion, degree, arrangement of parts, etc.) together with the specification, and are to be considered a portion of the entire "written description" of this invention, as required by 35 U.S.C. §112. Moreover, the drawings should generally be regarded as being to scale, unless otherwise indicated. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Unless otherwise indicated, the terms "inwardly" and "outwardly" refer to the orientation of a surface relative to its axis of elongation, or axis of rotation, as appropriate.

The invention broadly provides an improved fluid coupling device, of which a first preferred embodiment is illustrated in FIGS. 1-4, and a second preferred embodiment is illustrated in FIGS. 5-10. For the convenience of the reader these two embodiments will be described seriatim herebelow.

FIRST EMBODIMENT (FIGS. 1-4)

Referring now to FIG. 1, a first embodiment of the improved coupling device, generally indicated at 10, is shown as broadly including a leftward female section 11 and a rightward male section 12. In FIG. 1, these two sections are shown as being axially-aligned, but physically separated from one another.

Structure of Female Section 11

The leftward female section 11 is shown as having a horizontally-elongated tubular housing 13, a seat member 14 mounted within the housing for leftward and rightward sliding movement therealong, a rotary valve element 15 arranged within the housing and biased to engage the seat member, and a bearing member 16 continuously urging the valve element to move rightwardly into fluid-tight sealed engagement with the seat member.

Housing 13 is shown of being of three-piece construction, and broadly includes a left part 18, an intermediate post member 19, and a right part 20.

The housing left part 18 is shown as being a specially-configured horizontally-elongated tubular member having a leftward fitting portion, an outwardly-extending intermediate portion and a rightward tubular portion, all generated about horizontal axis x—x. The left part has annular vertical left and right end faces 21,22, respectively. The outer surface of housing left part 18 sequentially includes (from left to right in FIG. 1): an externally-threaded portion 23 extending rightwardly from left end face 21; an outwardly-facing horizontal cylindrical surface 24; a leftwardly-facing annular vertical surface 25; an outwardly-facing polygonal surface including a plurality of flats, severally indicated at 26; and an outwardly-facing horizontal cylindrical surface 28 continuing rightwardly therefrom to join right end face 22. The inner surface of housing left part 18 sequentially includes (from left to right in FIG. 1): an inwardly- and leftwardly-facing frusto-conical surface 29 extending rightwardly from left end face 21; an inwardly-facing horizontal cylindrical surface 30; a leftwardly-facing annular vertical surface 31; an inwardly-facing horizontal cylindrical surface 32; a rightwardly-facing annular vertical surface 33; an inwardly-facing horizontal cylindrical surface 34; a rightwardly-facing annular vertical surface 35; an inwardly-facing horizontal cylindrical surface 36; an internally-threaded portion 38; a rightwardly-facing annular vertical surface 39; and an inwardly-facing horizontal cylindrical surface 40 continuing rightwardly therefrom to join right end face 22.

The post member 19 is depicted as being a horizontally-elongated specifically-configured tubular member, also generated about horizontal axis x—x. Specifically, post member 19 has an annular vertical left face 41, and a somewhat U-shaped vertical right face 42. A through-bore, bounded by inwardly-facing horizontal cylindrical surface 43, extends between the left and right end faces 41,42. The outer surface of this post member sequentially includes (from left to right in FIG. 1): an outwardly-facing horizontal cylindrical surface 44; a leftwardly-facing annular vertical surface 45; an outwardly-facing horizontal cylindrical surface 46; a righwardly-facing annular vertical surface 48; an outwardly-facing horizontal cylindrical surface 49; a rightwardly-facing annular vertical surface 50; and an outwardly-facing horizontal cylindrical surface 51 extending rightwardly therefrom. A rightward upper generally-semicylindrical portion of the post member is shown as having been removed. Thus, a rightwardly-facing vertical surface 52, which has a somewhat inverted U-shaped appearance (not shown), extends downwardly from an intermediate portion of post surface 51 for a distance greater than the radius of surface 51, and communicates with two upwardly-facing planar horizontal surfaces, one of which is indicated at 53, which extend rightwardly therefrom. A pair of unwardly- and rightwardly-facing inclined surfaces, one of which is indicated at 54, join surfaces 53 with right end face 42. A radial lug is shown as extending downwardly from the underside of the right margin of post surface 51. Specifically, this lug is shown as being sequentially bounded by (from left to right in FIG. 1): an arcuate segment of an outwardly- and leftwardly-facing frusto-conical surface 55 extending rightwardly from surface 51; an arcuate segment of an outwardly-facing horizontal cylindrical surface 56; and an arcuate segment of an outwardly- and rightwardly-facing frusto-conical surface 58 which continues rightwardly to join right end face 42. The longitudinal side surfaces (not shown) of the post member lug are milled flat and vertical, so that the right marginal end portion of the post may enter the valve element. A horizontal hole 59 extends transversely through the post member lug portion. The post member 19 is positioned such that post member surfaces 41,45 are arranged to abut housing left part surfaces 33,35, respectively.

The housing right part 20 is shown as being a horizontally-elongated tubular member having annular vertical left and right end faces 60,61, respectively. The outer surface of housing right part 20 sequentially includes (from left to right in FIG. 1): an externally-threaded portin 62 extending rightwardly from left end face 60; a leftwardly-facing annular vertical surface 63; and an outwardly-facing horizontal cylindrical surface 64 continuing righwardly therefrom to join right end face 61. The housing right part 20 has a stepped axial through-bore, which is sequentially bounded by (from left to right in FIG. 1): an inwardly- and leftwardly-facing frusto-conical surface 65 extending rightwardly from left end face 60; and inwardly-facing horizontal cylindrical surface 66; a leftwardly-facing annular vertical abutment surface 68; an inwardly-facing horizontal cylindrical surface 69; an inwardly- and rightwardly-facing frusto-conical surface 70; an inwardly-facing horizontal cylindrical surface 71; and an inwardly- and righwardly-facing frusto-conical surface 72 continuing therefrom to join right end face 61.

The housing right part 20 is threaded into engagement with the housing lft part 18, with the outermost margin of the post member being captured between facing surfaces 35,60. An annular groove is shown as extending radially into the housing right part from surface 64 to receive and accommodate an O-ring 73, which engages left part surface 40 and seals the joint between the housing left and right parts. A plurality of radial holes, one of which is indicted at 74, are provided through the right marginal end portion of the housing right part, and severally communicate outer surface 64 with inner surface 71. Each of these radial holes 74 has an in-turned ball-retaining inner end portion, and accommodates the presence of a ball, one of which is indicated at 75, of the quick-disconnect mechanism.

The quick-disconnect mechanism also includes a tubular sleeve 76 surrounding the right marginal end portion of the assembled housing, and biased to move rightwardly against an annular retaining ring 78, which is received in a suitable groove extending radially into the housing from surface 64 thereof. Sleeve 76 is shown as having annular vertical left and right end faces 79,80, respectively. The sleeve has an inner surface which sequentially includes (from left to right in FIG. 1): an inwardly-facing horizontal cylindrical surface 81 extending rightwardly from left end face 79; a leftwardly-facing annular vertical abutment surface 82; an inwardly-facing horizontal cylindrical surface 83; an inwardly- and rightwardly-facing frusto-conical surface 84; and an inwardly-facing horizontal cylindrical surface 85 continuing rightwardly therefrom to join right end face 80. The outer surface of this sleeve is shown as having three axially-spaced knurled portions, severally indicated at 86. A coil spring 88 has its left end arranged to bear against housing surface 22, and has its right end arranged to bear against sleeve surface 82. Spring 88 is compressed, and continuously biases the sleeve 76 to move rightwardly relative to the housing until sleeve surface 84 abuts retaining ring 78. However, an opeator may grasp sleeve 76, and displace it leftwardly relative to the housing (i.e., from the position shown in FIG. 2 to the position shown in FIG. 3) so that balls 75 may move radially outwardly toward larger-diameter sleeve surface 85.

The seat member 14 is shown as being a horizontally-elongated tubular member slidably mounted within the housing, and has annular vertical left and right end faces 89,90, respectively. The stepped outer surface of the seat member sequentially includes (from left to right in FIG. 1): an outwardly-facing horizontal cylindrical surface 91 extending rightwardly from left end face 89 and arranged to slidably engage housing surface 66; a rightwardly-facing annular vertical abutment surface 92 arranged to be moved toward and away from housing abutment surface 68; and an outwardly-facing horizontal cylindrical surface 93 continuing rightwardly therefrom to join right end face 90. An annular groove extends radially into the seat member from surface 91 to receive and accommodate an O-ring 94, which seals the sliding joint between the seat member and the housing. The inner surface of the seat member is shown as including an inwardly-facing horizontal cylindrical surface 95 extending rightwardly from left end face 89, and an inwardly- and leftwardly-facing annular concave spherically-segmented surface 96 which tangentially joins surface 95 and continues rightwardly and inwardly therefrom to join right end face 90. An annular groove extends into the seat member from surface 96 to receive and accommodate a suitable seal member 98, which sealingly engages the outer surface of the valve element. This seal member is shown as including a low-friction ring, preferably formed of polyetrafluoroethylene or the like, biased to engage the valve element outer surface.

Figure 2:
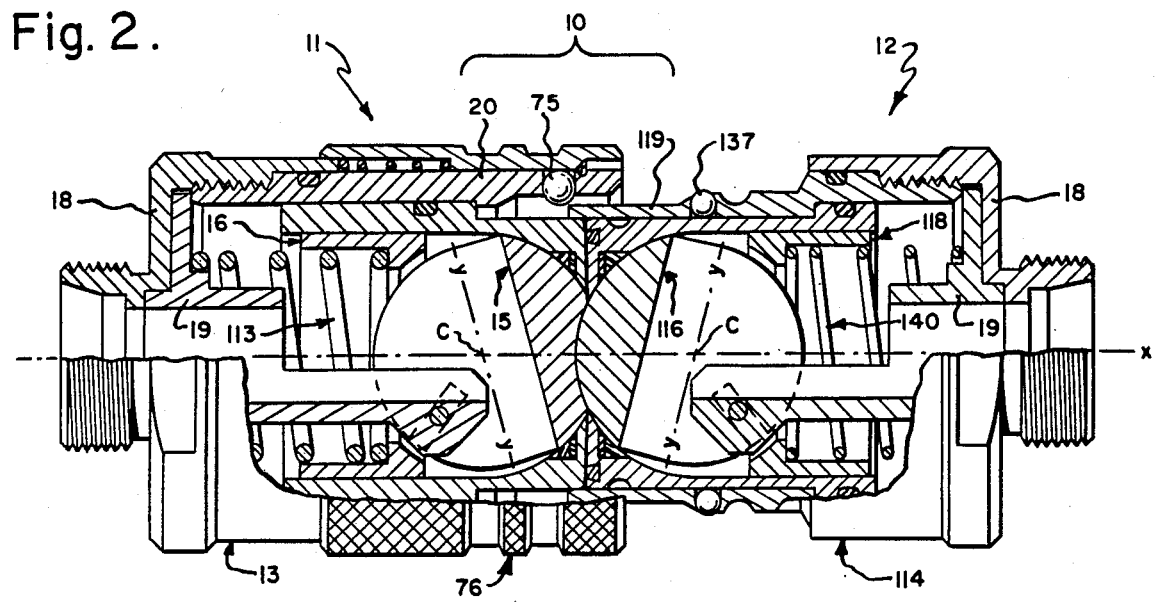
FIG. 2 is a fragmentary longitudinal vertical sectional view of the improved coupling device shown in FIG. 1, but showing the male and female sections as having been brought together such that the housings are in a first relative position, this view continuing to show the respective valve elements as being in their flow-preventing positions.
Figure 3:
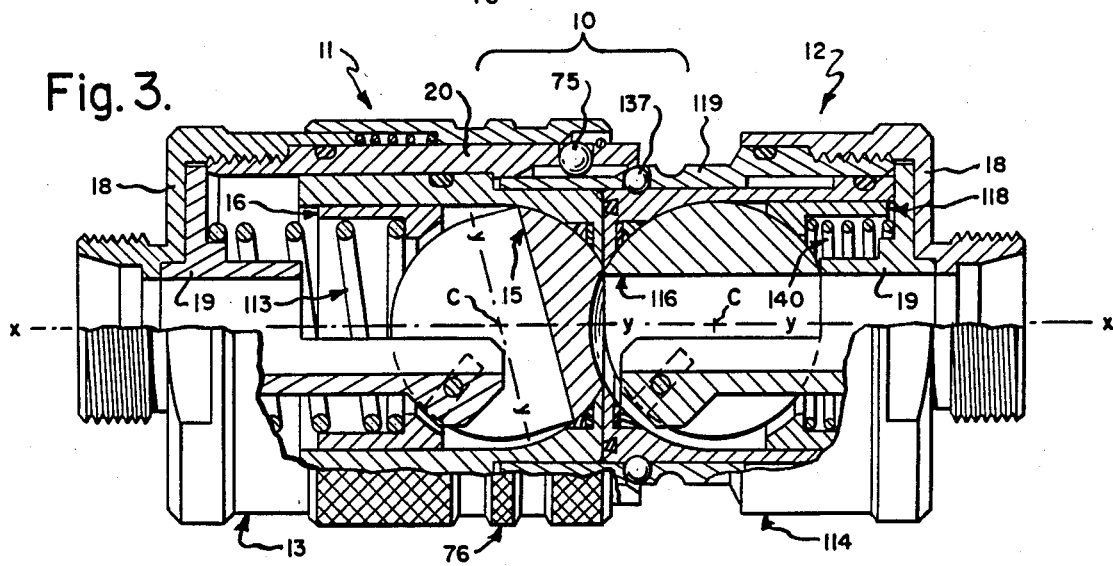
FIG. 3 is a fragmentary longitudinal vertical sectial view thereof, generally similar to the view of FIG. 2, but showing the male section as having been further inserted into the female section such that the housings are in a second relative position, this view also showing the male valve element as having been rotated to its flow-permitting position while the female valve element is still in its flow-preventing position.

The rotary valve element 15 is shown as being in the form of a spherical ball, and has an ouwardly-facing spherical surface 99 generated about a center C. Valve element 15 is further shown as having a tunnel-shaped through-slot bounded by a diametrical semicylindrical surface 100 and two planar parallel surfaces, one of which is indicated at 101, extending tangentially therefrom to join ball outer surface 99. Semicylindrical surface 100 is shown as being generated about axis y—y, which intersects the center C of the ball. A concave spherically-segmented recess 102 is shown as extending into valve element 15 from its outer surface 99 to receive and accommodate a complimentarily-configured convex portion of the male section valve element when the two coupling sections are brought together, as shown in FIGS. 2 and 3. Moreover, two rectangular slots, one of which is shown in phantom and indicated at 103, extend radially into the valve element from its outer surface 99. These two slots receive and accommodate the marginal end portions of a pivot pin 104 which is arranged in post member transverse hole 59. Thus, the axis of pin 104 is eccentric to the center of valve element 15. These slots 103 permit radial inward and outward movement of the pin relative to the valve element when the valve element moves axially relative to the housing, and impart rotational movement to the valve element.

Figure 4:
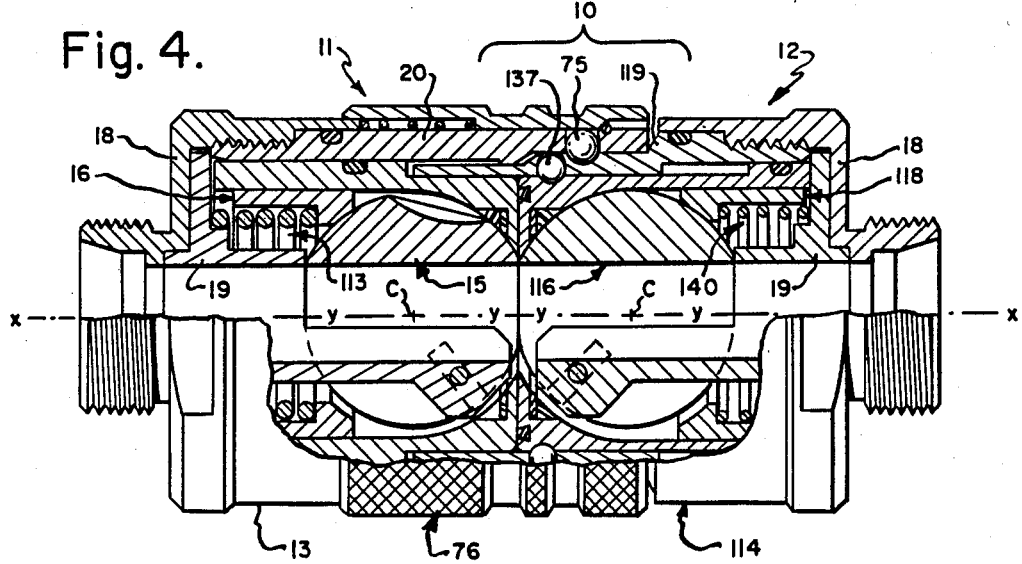
FIG. 4 is a fragmentary longitudinal vertical sectional view thereof, generally similar to the view of FIG. 3, but showing the male section as having been still further inserted into the female section such that the housings are in a third relative position, and showing the female section valve element as also having been rotated to its flow-permitting position so as to establish the full flow passage through the connected coupling device.

The bearing member 16 is shown as being a horizontally-elongated tubular member having annular vertical left and right end faces 105,106, respectively, and an outwardly-facing horizontal cylindrical surface 108 extending therebetween. Surface 108 is arranged to slidably engage seat member surface 95. The inner surface of the bearing member sequentially includes (from left to right in FIG. 1): an inwardly-facing horizontal cylindrical surface 109 extending rightwardly from left end face 105; a leftwardly-facing annular vertical surface 110; an inwardly-facing horizontal cylindrical surface 111; and an annular inwardly- and rightwardly-facing spherically-segmented surface 112 arranged to bear against the valve element outer surface 99. Bearing member 16 is biased to move rightwardly into continuous engagement with the valve element by a coil spring 113. The left end of spring 113 surrounds post member surface 49 and is arranged to bear against post surface 48, while the right end of this spring acts against bearing member surface 110. Thus, spring 113 continuously urges the bearing member, the valve element and the seat member, to move rightwardly relative to the housing, until seat member surface 92 abuts housing surface 68, as shown in FIGS. 1–3. At the same time, the seat member, the valve element, and the bearing member may be selectively moved leftwardly relative to the housing, by compliant compression of spring 113, as shown in FIG. 4. Such axial motion will cause the valve element to rotate about its center. When the seat member is in its extreme rightward position, as shown in FIGS. 1–3, valve element 15 is in its flow-preventing position, and concave recess 102 faces rightwardly to receive the convex portion of the male valve element. However, the seat member may be displaced leftwardly relative to the housing to rotate the valve element to its flow-permitting position, as shown in FIG. 4.

Structure of Male Section 12

Still referring principally to FIG. 1, the rightward male section is also shown as having a horizontally-elongated tubular housing 114, a seat member 115 mounted within the housing for leftward and rightward axial sliding movement relative thereto, a rotary valve element 116 arranged within the housing and continuously engaging the seat member, and a bearing member 118 biased to move leftwardly into continuous engagement with the valve element.

The male housing 114 is also shown as being of three-piece construction, and broadly includes a right part, an intermediate post member, and a left part 119. The male housing right part and post member are structurally similar to the female housing left part and post member, respectively, previously described. Hence, the same reference numeral has been used to identify the corresponding parts, potions or surfaces of the male housing right part and post member, it being understood that these two elements of the male section are arranged as mirror images of the corresponding structure of the female section.

The male housing left part 119 is shown as having annular vertical left and right end faces 120,121, respectively. The outer surface of housing part 119 sequentially includes (from left to right in FIG. 1): an outwardly-facing horizontal cylindrical surface 122 extending rightwardly from left end face 120; an outwardly- and leftwardly-facing frusto-conical surface 123; an outwardly-facing horizontal cylindrical surface 124; an outwardly- and leftwardly-facing frusto-conical surface 125; an outwardly-facing horizontal cylindrical surface 126; a rightwardly-facing annular vertical surface 128, an externally-threaded portion 129 continuing rightwardly therefrom to join right end face 121. An annular groove 130, having a somewhat U-shaped transverse cross-section, extends radially into housing part 119 from outer surface 124. Another annular groove is shown as extending into housing part 119 from surface 126 to receive and accommodate an O-ring 131, which sealingly engages surface 40 and seals the sliding joint between the male housing left and right parts. The inner surface of housing left part 119 sequentially includes (from left to right in FIG. 1): an inwardly-facing horizontal cylindrical surface 132 extending rightwardly from left end face 120; a rightwardly-facing annular vertical surface 133, and an inwardly-facing horizontal cylindrical surface 134; and an inwardly- and rightwardly-facing frusto-conical surface 135 continuing therefrom to join right end face 121. A plurality of radial through-holes, one of which is indicated at 136, communicate inner surface 132 with outer surfaces 123,124, to receive and accommodate a like plurality of balls, one of which is indicated at 137. The male section housing is created by assembling right part 18, post member 19 and left part 119 together, as shown. Here again, the outer margin of the post member flange is captured between the left and right housing parts.

Seat member 115 is generally similar to seat member 14, although depicted as a mirror image of same. Since the structure of seat member 115 is subtantially the same as the structure of seat member 14, the same reference numerals have been applied to the male seat member, except as mentioned below. The principal differences between the male and female seat members lie in the relative lengths of surfaces 91,93, the radial dimension between surfaces 91,95, and the diameters of surfaces 91,93. An annular groove 138, having a somewhat U-shaped transverse cross-section, is shown as extending radially into the male seat member 115 from surface 93. Another annular groove extends rightwardly into seat member 115 from its left end face to receive and accommodate an O-ring or seal member 139. Thus, when the two housing sections are moved toward one another, seal member 139 engages female seat member end face 90 to provide a sealed joint between the male and female seat members.

Rotary valve element 116 is substantially the same as valve element 15, although the concave recess 102 has been omitted. Here again, while the male valve element 116 is depicted as being a mirror image of the female valve element 15, the same reference numerals have been used to identify like portions, elements or surfaces of the male valve element.

The male bearing member 118 is also shown as being substantially a mirror image of female bearing member 16. Hence, the same reference numerals have been used to identify the corresponding parts, portions or surfaces of the male bearing member.

A coil spring 140 is arranged to act between the male housing and the bearing member, and continuously urges male bearing member 118 to move leftwardly against the outer surface of valve element 116. The right end of the spring bears against male housing surface 48, and the left end of the spring bears against seat member surface 110. Thus, spring 140 continuously urges bearing member 118, ball 116 and seat member 115, to move leftwardly relative to male housing 114 until seat member surface 92 engages housing surface 133. However, female spring 113 exerts a substantially greater force on female valve element 15 than male spring 140 exerts on male valve element 116. This differential of such opposing forces enables the proper sequence of valve element rotation in the first embodiment.

Operation of First Embodiment

The opeation of the first embodiment is comparatively illustrated in FIGS. 2-4.

Assume that the male and female couplig sectios are initially separated, as shown in FIG. 1. From this initial condition, the male section may be moved axially leftwardly to initially engage the female section, as shown in FIG. 2. In this condition, the left margin of male housing surface 132 will slidably overlap the right margin of female seat member surface 93, and the right face of the female seat member will abut the left face of the male seat member, with O-ring 139 sealing the joint therebetween. Female spring 113 causes seat member surface 92 to abut female housing surface 68. Similarly, male spring 140 causes seat member surface 92 to abut male housing surface 133. Thus, in the condition shown in FIG. 2, the male section is axially aligned with and contacts the female section, but both rotary valve elements remain in their respective flow-preventing positions. The structure shown in FIG. 2 illustrates a first relative position between the male and female housings.

Thereafter, the male section may be axially inserted into the female section to the intermediate position shown in FIG. 3, which represents a second relative position between the male and female housings. In FIG. 3, the left margin of male housing surface 132 is shown as encircling a greater portion of female bearing member surface 93. At the same time, since spring 113 exerts a greater force on female valve element 15 than opposing spring 140 exerts on male element 116, spring 140 will be compressed when the male housing is further inserted into the female housing. Hence, in FIG. 3, the male seat member, valve element and bearing member are shown as having been displaced rightwardly relative to the male housing. In this second relative position, balls 137 are shown as having been moved radially inwardly and received in now radially-aligned groove 138, and male bearing member right end face 105 abuts male housing surface 48. Moreover, because of such axial displacement, the male valve element 116 is depicted as having been rotated in a clockwise direction so that the slot axis y—y thereof is coincident with housing horizontal axis x—x. Hence, male valve element 116 is now in its flow-permitting position. At the same time, the greater force exerted by female spring 113 has precluded the female seat member, valve element and bearing member, from moving leftwardly relative to the female housing. Hence, the female valve element 15 has not moved axially nor rotated relative to the female housing, and continues to be in its flow-preventing position when the housings are in the second relative position shown in FIG. 3.

FIG. 4 illustrates a third relative position of the housings resulting from still further axial insertion of the male section into the female section. Such further insertion is permitted because balls 137 moved radially inwardly and were received in male section groove 138. Thus, as the male section is inserted further into the female secton, (i.e., from the position shown in FIG. 3 to the position shown in FIG. 4), the left end face 120 of the male section bearing member, now abutting male housing surface 48, displaces the female bearing member leftwardly relative to the female housing. Hence, upon such further insertion of the male section, the female bearing member, rotary valve element and bearing member, are displaced leftwardly relative to the female housing, through compliant compression of female spring 113. Such axial displacement causes the female valve element to rotate counterclockwise from its flow-preventing position (as shown in FIG. 3) to its flow-permitting position (as shown in FIG. 4). In this flow-permitting position, the axis y—y of female valve element through-slot is coincident with horizontal female housing axis x—x. Such rotation of the female valve element is accommodated because the male valve element has been previously rotated to its flow-permitting position. Hence, a portion of the outer spherical surface 99 of the female valve element may actually enter the open left mouth of the previously-rotated male valve element, to permit such rotation of the female valve element.

When the coupling sections are in the condition shown in FIG. 4, sleeve 76 may be released to drive balls 75 radially inwardly into locking engagement with male housing groove 130.

To separate the two coupling sections, the foregoing sequence is reversed. Specifically, referring to FIG. 4, the sleeve member 76 is first moved leftwardly relative to the female housing, so as to permit balls 75 to move radially outwardly. Thereafter, the male section may be moved axially rightwardly relative to the female section. Such relative motion permits stiffer female spring 113 to expand, causing female valve element 15 to rotate from its flow-permitting position to its flow-preventing position, as shown in FIG. 3. At this point, sleeve 76 may be released. Thereafter, the male section may be moved further rightwardly relative to the female section from the second relative position shown in FIG. 3 to the first relative position shown in FIG. 2. During such futher motion, male section spring 140 expands, causing the male valve element to now rotate from its flow-permitting position to its flow-preventing position, as shown in FIG. 2. Thereafter, the male and female sections may be physically separated from one another.

SECOND EMBODIMENT (FIGS. 5-10)

Figure 5:
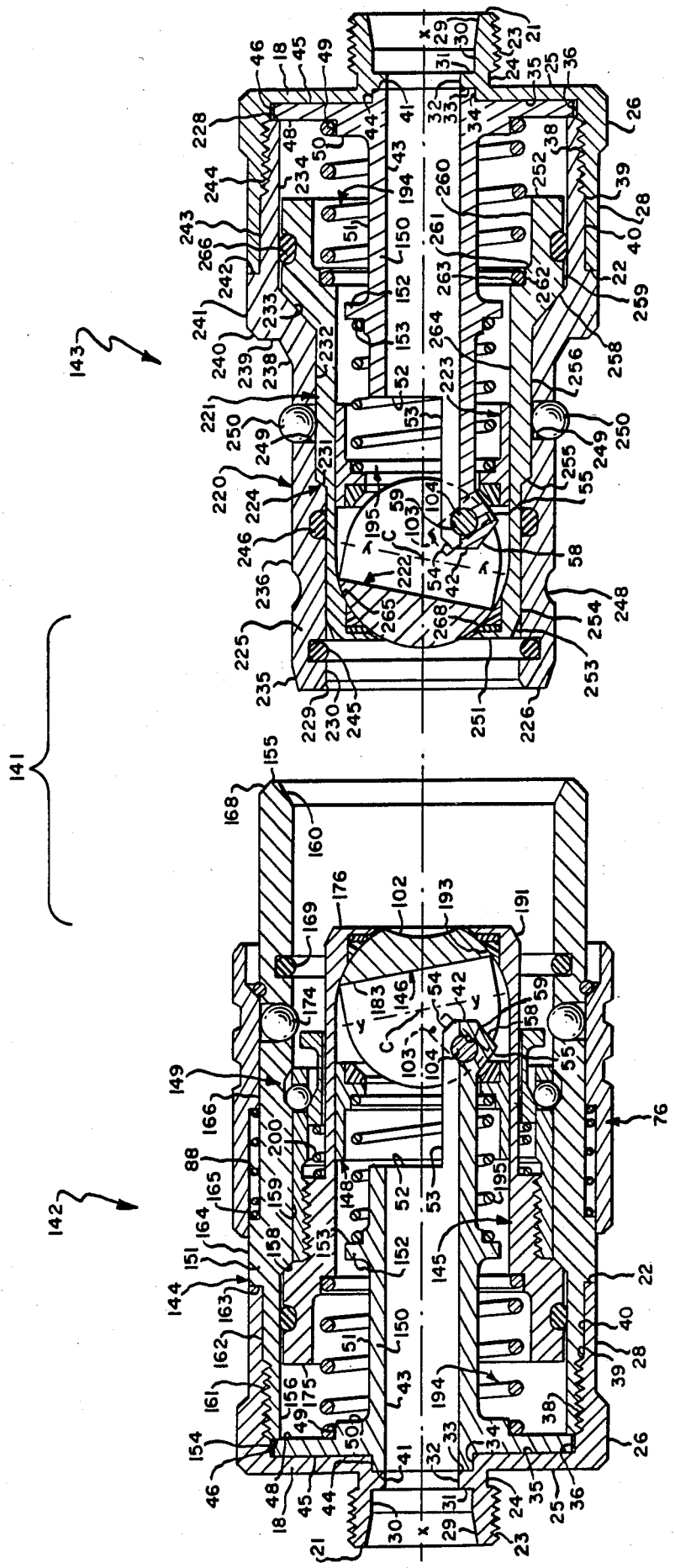
FIG. 5 is a fragmentary longitudinal vertical sectional view of a second embodiment of the improved fluid coupling device, this view showing the axially-aligned male and female sections as being separated from one another, and showing the two valve elements being in their flow-preventing positions.

Referring now to FIG. 5, a second embodiment of the improved coupling device, generally indicated at 141, is again shown as broadly including a leftward female section 142 and a rightward male section 143. Here again, these two sections are shown as being axially-aligned, but physically separated from one another in FIG. 5.

Structure of Female Section 142

The leftward female section 142 is again shown as having a horizontally-elongated tubular housing 144, a seat member 145 mounted within the housing for leftward and rightward sliding movement therealong, a rotary valve element 146 arranged within the housing and biased to engage the seat member, and a bearing member 148 continuously urging the valve element to move rightwardly into fluid-tight sealed engagement with the seat member. However, in the second embodiment, the female section is shown as additionally including a first interlock mechanism 149.

As in the first embodiment, housing 144 is again shown as being of three-piece construction, and broadly includes a left part 18, an intermediate post member 150, and a right part 151.

The housing left part 18 is substantially the same as that in the first embodiment. Hence, the same reference numerals have been used to identify like portions, elements and surfaces, previously described.

The post member 150 is substantially the same as the post member in the first embodiment, except as described below. Hence, the same reference numerals have been used to identify like portions, elements and surfaces of post member 150. However, a radial flange 152 is shown as extending outwardly from post outer surface 51. This radial flange has a rightwardly-facing annular vertical surface 153. Moreover, in the second embodiment, the transverse hole 59 intersects through-bore surface 43. However, pivot pin 104 is somewhat saddle-shaped, and has a concave central portion (not shown) complimentarily configured to the shape of the post through-bore surface 43.

Figure 10:
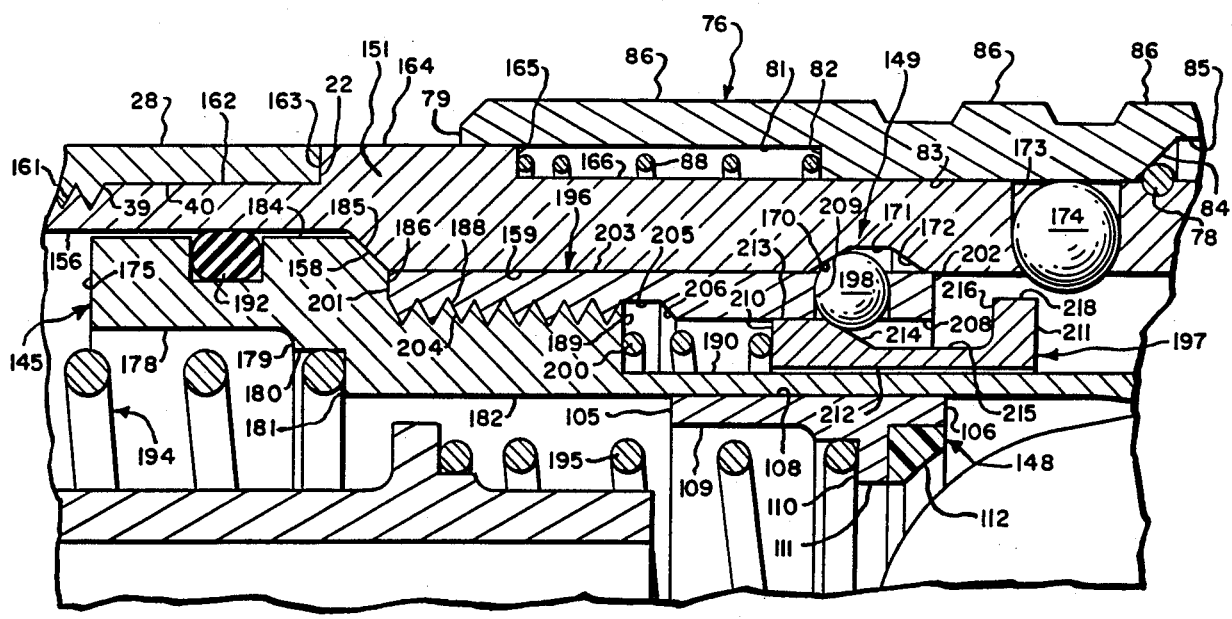
FIG. 10 is a further enlarged fragmentary detail view of the first interlock mechanism, and surrounding structure, in the female section, in the condition shown in FIG. 1.

The housing right part 151 is shown as being a horizontally-elongated tubular member having annular vertical left and right end faces 154,155, respectively. Housing right part 151 has a stepped axial through-bore which is sequentially bounded by (from left to right in FIGS. 5 and 10): an inwardly-facing horizontal cylindrical surface 156 extending rightwardly from left end face 154; an inwardly- and leftwardly-facing frusto-conical surface 158; an inwardly-facing horizontal cylindrical surface 159; and an inwardly- and rightwardly-facing frusto-conical surface 160 continuing rightwardly therefrom to join right end face 155. The housing right part 151 has an outer surface which sequentially includes (from left to right in FIG. 5): an externally-threaded portion 161 extending rightwardly from left end face 154; an outwardly-facing horizontal cylindrical surface 162; a leftwardly-facing annular vertical surface 163; an outwardly-facing horizontal cylindrical suruface 164; a rightwardly-facing annular vertical surface 165; an outwardly-facing cylindrical surface 166; and an outwardly- and rightwardly-facing frusto-conical surface 168 continuing rightwardly therefrom to join right end face 155. An annular groove extends radially into the housing right part from its inner surface 159 to receive and accomodate an O-ring 169. This O-ring is adapted to sealingly engage the male housing outer surface when the two sections are joined together. Another annular groove is shown as extending radially into housing right part 151 from surface 159. This annular groove is used with the first interlock mechanism, and as best shown in FIG. 10, is sequentially bounded by (from left to right): an inwardly- and rightwardly-facing frusto-conical surface 170; an inwardly-facing horizontal cylindrical surface 171; and an inwardly- and leftwardly-facing frusto-conical surface 172. The housing right part 151 is further shown as being provided with a plurality of radial through-holes, one of which is indicated at 173, to receive and accommodate a like plurality of balls 174 of the quick-disconnect mechanism.

The female housing is formed by threading the housing right part 151 into engagement with the housing left part 18, such that the post member is captured between housing surfaces 35,154.

Referring now to FIGS. 5-10, the quick-disconnect mechanism includes balls 174, and an outermost tubular sleeve, again indicated at 76, surrounding the right marginal end portion of the assembled female housing. Here again, a spring 88 biases the sleeve member 76 to move rightwardly relative to the housing until the sleeve abuts a retaining ring 78. Sleeve member 76 is as previously described.

As shown in FIGS. 5 and 10, the female seat member 145 is shown as being a horizontally-elongated tubular member having annular vertical left and right end faces 175,176, respectively. This seat member has an inner surface which is sequentially bounded by (from left to right in FIGS. 5 and 10): an inwardly-facing horizontal cylindrical surface 178 extending rightwardly from left end face 175; a leftwardly-facing annular vertical surface 179; an inwardly-facing horizontal cylindrical surface 180; a leftwardly-facing annular vertical surface 181; an inwardly-facing horizontal cylindrical surface 182; and an inwardly- and leftwardly-facing spherically-segmented surface 183 continuing rightwardly therefrom to join right end face 176. The female seat member has an outer surface which sequentially includes (from left to right in FIGS. 5 and 10): an outwardly-facing horizontal cylindrical surface 184 slidably engaging housing surface 156; an outwardly- and rightwardly-facing frusto-conical surface 185 arranged to move toward and away from housing surface 158; a rightwardly-facing annular vertical surface 186; an externally-threaded portion 188 continuing rightwardly therefrom; a rightwardly-facing annular vertical surface 189; an outwardly-facing horizontal cylindrical surface 190; and an outwardly- and rightwardly-facing frusto-conical surface 191 continuing therefrom to join right end face 176. An annular groove extends radially into seat member surface 184 to receive and accommodate an O-ring 192, which sealingly and slidably engages housing surface 156. Another annular groove is shown as extending into the seat member from surface 183, to receive and accommodate a suitable seal member 193, which engages the outer surface of the female valve element 146. A coil spring 194 has its left end arranged to bear against post surface 48, and has its right end arranged to bear against seat member surface 181. Spring 194 is compressed, and continuously biases the seat member to move rightwardly relative to the housing until seat member surface 185 abuts housing surface 158, as shown in FIGS. 5–8 and 10.

Still referring principally to FIG. 10, the bearing member 148 is shown as being substantially the same as the bearing member 16 of the first embodiment, except that bearing member 148 is shown as having a low-friction insert, preferably formed of polytetrafluoroethylene, which engages the outer surface of valve element 146. Hence, the same reference numerals have been used to identify the same structure previously described. A coil spring 195 has its left end arranged to act against post abutment surface 153, and has its right end arranged to act against bearing member surface 110. Spring 195 is compressed, and continuously biases the bearing member to move rightwardly against the outer surface of female valve element 146.

The first interlock mechanism 149 is shown as including a link member 196, a plurality of balls, severally indicated at 198, a slide member 199, and a spring 200 arranged to act between the seat member and the slide. The link member 196 is shown as being a horizontally-elongated tubular member having annular vertical left and right end faces 201, 202, respectively, and an outwardly-facing cylindrical surface 203 extending therebetween. The inner surface of link 196 is shown as sequentially including (from left to right in FIG. 10): an internally-threaded portion 204 extending rightwardly from left end face 201; an inwardly-facing horizontal cylindrical surface 205; an inwardly- and leftwardly-facing frusto-conical surface 206; and an inwardly-facing horizontal cylindrical surface 208 continuing rightwardly therefrom to join right end face 202. A plurality of radial through-holes 209 communicate link outer surface 203 with link inner surface 208, to accommodate a like plurality of balls severally indicated at 198. Link 196 is shown as being threaded into engagement with seat member threaded portion 188 such that link left end face 201 abuts seat member surface 186.

The slide member 199 is shown as being a specially-configured tubular member having annular vertical left and right end faces 210, 211, respectively, and an inwardly-facing horizontal cylindrical surface 212 extending therebetween. The outer surface of the slide is shown as sequentially including (from left to right in FIGS. 5 and 10): an outwardly-facing horizontal cylindrical surface 213 extending rightwardly from left end face 210; an outwardly- and rightwardly-facing frusto-conical surface 214; an outwardly-facing horizontal cylindrical surface 215; a leftwardly-facing annular vertical surface 216; and an outwardly-facing horizontal cylindrical surface 218 continuing rightwardly therefrom to join right end face 211. Spring 200 has its left end arranged to bear against seat member surface 189, and has its right end arranged to bear against slide member left end face 210. Spring 200 is compressed, and continuously urges the slide member 199 to move rightwardly relative to the seat member. However, when the seat member is in its extreme rightward position, as shown in FIGS. 5 and 10, interlock balls 198 will engage the link through-holes and slide surface 214 to provide a limit to rightward movement of the slide relative to the seat member.

The female valve element 146 is substantially the same as the female valve element 15 of the first embodiment. Hence, the same reference numerals have been used to identify like portions and surfaces, previously described.

Structure of Male Section 143

As best shown in FIG. 5, the male sectin 143 is shown as broadly including a horizontally-elongated tubular housing 220, a seat member 221 slidably mounted in the housing for leftward and rightward movement therealong, a rotary valve element 222, and a bearing member 223. The male housing is shown as further including a second interlock mechanism, generally indicated at 224.

The male housing 220 is again shown as being of three-piece construction, and includes a right part 18, an intermediate post member 150, and a left part 225. The male housing right part 18 is the same as the female housing left part 18. Hence, the same reference numerals have been employed to identify the corresponding surfaces on the housing right part 18, it being understood that male housing right part 18 is arranged as a mirror image of female housing part 18. Similarly, the post member 150 of the male section is structurally identical to the post 150 of the female section, albeit arranged as a mirror image of the female post member.

Figure 9:
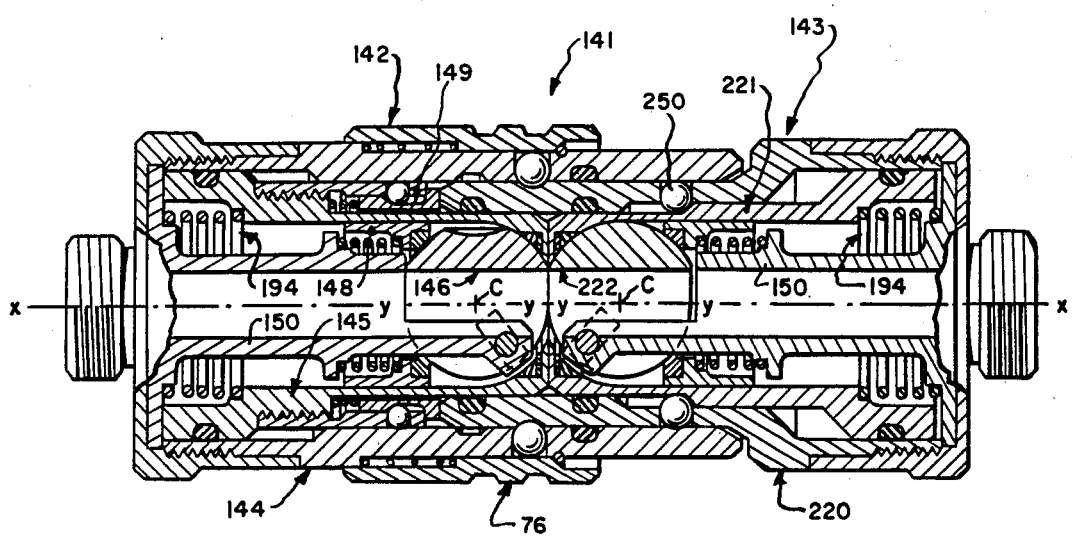
FIG. 9 is a fragmentary longitudinal vertical sectional view thereof, generally similar to the view of FIG. 8, but showing the male section as having been still further inserted into the female section such that the housings are in a third relative positin, and showing the female valve element as also having been rotated to its flow-permitting positin so as to establish the full flow passage through the connected coupling device.

The male housing left part is shown as being a horizonally-elongated specially-configured tubular member having annular vertical left and right end faces 226, 228, respectively. The inner surface of male housing left part 225 sequentially includes (from left to right in FIG. 5): an inwardly- and leftwardly-facing frusto-conical surface 229; an inwardly-facing horizontal cylindrical surface 230; an inwardly- and rightwardly-facing frusto-conical surface 231; an inwardly-facing horizontal cylindrical surface 232; an inwardly- and rightwardly-facing frusto-conical surface 233, and an inwardly-facing horizontal cylindrical surface 234 continuing rightwardly therefrom to join right end face 228. The outer surface of the male housing left part sequentially includes (from left to right in FIG. 5): an outwardly- and leftwardly-facing frusto-conical surface 235 extending rightwardly from left end face 226; an outwardly-facing horizontal cylindrical surface 236; an outwardly- and leftwardly-facing frusto-conical surface 238; a leftwardly-facing annular vertical surface 239; an outwardly- and leftwardly-facing frusto-conical surface 240; an ouwardly-facing horizontal cylindrical surface 241; a rightwardly-facing annular vertical surface 242; an outwardly-facing horizontal cylindrical suface 243; and an externally-threaded portion 224 continuing rightwardly therefrom to join right end face 228. Adjacent its left end, an annular groove is shown as extending radially into the housing left part from inner surface 230 to receive and accommodate an O-ring 245, which sealingly engages female seat member surface 190 when the male and female sections are joined together. Another annular groove extends radially into the male housing left part from surface 230 to receive and accommodate another O-ring 246, which sealingly engages the male seat member. Still another annular groove 248 extends radially into the male housing from outer surface 236, to be aligned with quick-disconnect balls 174 when the two sections are joined together, as shown in FIG. 9. The male housing right part is assembled, as shown, such that the post member is captured between surfaces 35,228.

The second interlock mechanism 224 is shown, in pertinent part, as including a plurality of radial through-holes, severally indicated at 249, which communicate housing inner surface 232 with housing outer surface 236, and a like plurality of balls, severally indicated at 250, arranged in these through-holes.

The male seat member 221 is shown as being a specially-configured horizontally-elongated tubular member having annular vertical left and right end faces 251,252, respectively. The outer surface of male seat member 221 sequentially includes (from left to right in FIG. 5): an outwardly- and leftwardly-facing frusto-conical surface 253 extending rightwardly from left end face 251; an outwardly-facing horizontal cylindrical surface 254; an outwardly- and leftwardly-facing frusto-conical surface 255 arranged to move toward and away from facing housing surface 231; an outwardly-facing horizontal cylindrical surface 256; an outwardly- and leftwardly-facing frusto-conical surface 258 arranged to move toward and away from housing surface 233; and an outwardly-facing horizontal cylindrical surface 259 continuing rightwardly therefrom to join right end face 252. Seat member surfaces 254,256,259 are arranged to slidably engage housing surfaces 230,232,234, respectively. The inner surface of the male seat member sequentially includes (from right to left in FIG. 5): an inwardly-facing horizontal cylindrical surface 260 extending leftwardly from right end face 252; a rightwardly-facing annular vertical surface 261; an inwardly-facing horizontal cylindrical surface 262; a rightwardly-facing annular vertical surface 263; an inwardly-facing horizontal cylindrical surface 264; and an inwardly- and rightwardly-facing spherically-segmented surface 265 continuing rightwardly therefrom to join left end face 251. An annular groove is shown as extending radially into the seat member from outer surface 259 to receive and accommodate an O-ring 266, which sealingly engages housing surface 234. Another annular groove extends into the seat member from spherically-segmented surface 265 to receive and accommodate a seal member 268 which engages the outer surface male valve element 222.

A coil spring, again indicated at 194, is arranged to act between post surface 48 and seat member surface 263. Spring 194, which may be identical to the correspondingly-numbered spring of the female section, is arranged to continuously urge the seat member to move leftwardly relative to the male housing.

The bearing member 223 of the male section is substantially equivalent to the bearing member 148 of the female section, albeit arranged as a mirror image of the latter. A coil spring 195 is arranged to act between the post flange and the bearing member. Specifically, spring 195, which may be identical to the correspondingly-numbered spring of the female section, has its right end arranged to act against post member flange surface 153, and has its left end arranged to act against bearing member surface 110, and continuously urges the bearing member to move leftwardly into engagement with the outer surface of male valve element 222.

The male valve element 222 is substantially the same as the female valve element 146, except that recess 102 has been eliminated. The male valve element is otherwise shown as being arranged as a mirror image of the female valve element.

Operation of Second Embodiment

The operation of the second embodiment is comparatively illustrated in FIGS. 6–9.

Figure 6:
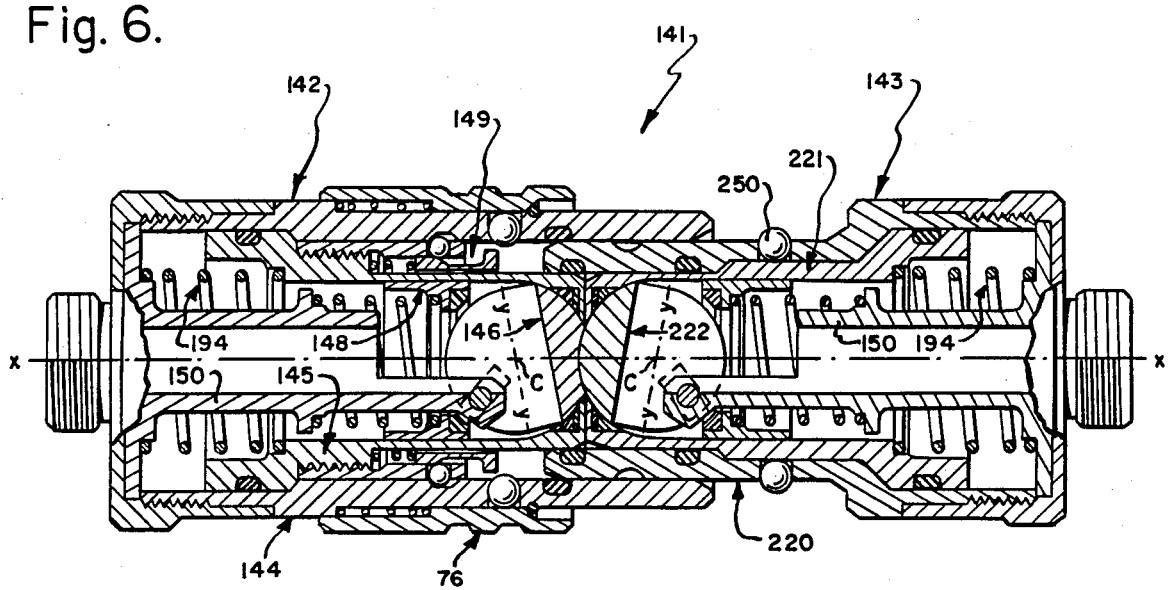
FIG. 6 is a fragmentary longitudinal vertical sectional view of the improved coupling device shown in FIG. 5, but showing the male and female sectios as having been brought together such that the housings are in a first relative position, this view continuing to show the respective valve elements as being in their flow-preventing positions.

Again assume that the male and female coupling sections are initially separated, as shown in FIG. 5. Thereafter, the male section 143 may be moved axially leftwardly to initally engage the female section, as shown in FIG. 6. In this position, the left margin of male housing inner surface 230 will surround the right margin of female seat member surface 190, and O-ring 245 will seal the joint between the male housing and the female seat member. At the same time, O-ring 169 seals the sliding joint between the male and female housings. In the position shown in FIG. 6, which represents a first relative position of the male and female housings, the male seat member remains in its leftwardmost position relative to the male housing, and, conversely, the female seat member is still in its rightwardmost position relative to the female housing. It should also be noted that the convex portion of male valve element 222 is received in the rightwardly-facing concave recess 102 provided in the female valve element 146. Hence, both of the valve elements are in their flow-preventing positions.

Figure 7:
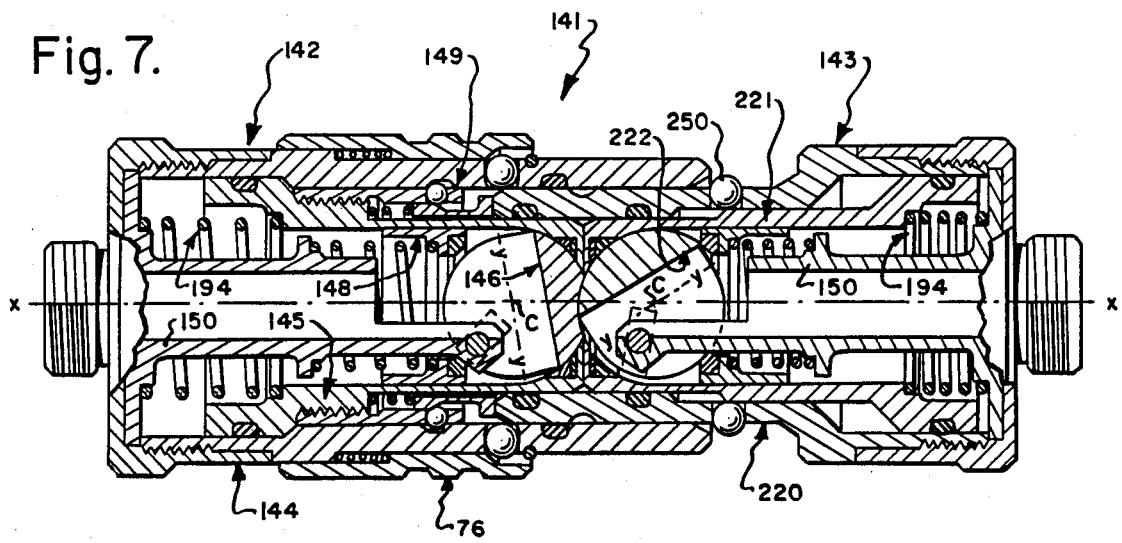
FIG. 7 is a fragmentary longitudinal vertical sectional view thereof, generally similar to the view of FIG. 6, but showing the male section as having been further inserted into the female section, and showing the male valve element as having been rotated so as to approach its flow-permitting position while the female valve element is still in its flow-preventing position.

Assume now that the male section is further inserted axially into the female section, to the position shown in FIG. 7. The quick-disconnect sleeve member 76 is shown as having been shifted leftwardly relative to the female housing to permit balls 174 to move radially outwardly. During such insertion, female seat member has been restrained from axial movement relative to the female housing by first interlock balls 198, which are wedged between interlock link surface 209 and female housing groove surface 170. Hence, the female seat member can not move axially leftwardly relative to the female housing, and the female valve element remains in its flow-preventing position. However, because the male seat member left end face 251 engaged the temporarily-restrained right end face of female seat member 145, such axial insertion of the male section has produced rightward displacement of the male seat member relative to the male housing. Such axial motion of the male seat member relative to the male housing has caused a corresponding angular rotation of the male valve element toward its flow-permitting position. However, in FIG. 7, the male valve element has not yet reached its flow-permitting position, and male seat member right end face 252 remains horizontally spaced from male post surface 48. At the same time, the leftward end face 226 of male housing is shown as having just abutted the right end face 211 of the first interlock slide. First interlock balls 198 remained wedged between interlock surface 209 and female housing surface 170. However, the several balls 250 of the second interlock mechanism are shown as ready to move radially inwardly upon further axial movement of the male seat member relative to the male housing.

Figure 8:
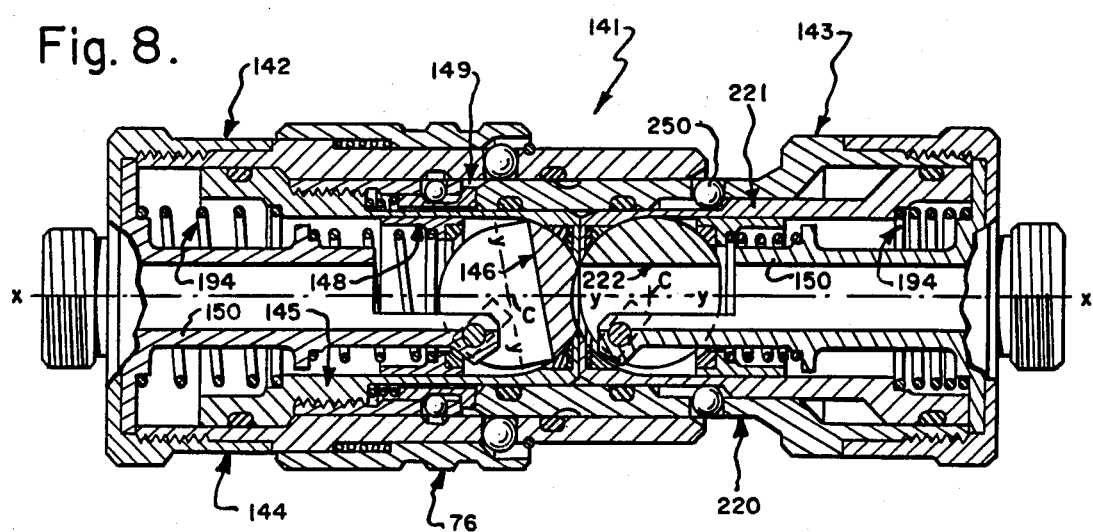
FIG. 8 is a fragmentary longitudinal vertical sectional view thereof, generally similar to the view of FIG. 7, but showing the male section as having been further inserted into the female section such that the housings are in a second relative position, this view also showing the balls of the first and second interlock mechanisms as having moved radially inwardly, and also showing the malve valve element as having been further rotated to its flow-permitting position while the female valve element remains in its flow-preventing position.

Assume now that the male housing is further inserted into the female housing, to the second relative position therebetween shown in FIG. 8. Such additional displacement has caused the male seat member to move further rightwardly relative to the male housing, until the right end face 252 of the male seat member abuts post surface 48. Second interlock balls 250 are now free to move radially inwardly to engage male seat member surface 254. At the same time, such further leftward movement of the male housing relative to the female housing, has displaced the interlock slide 199 leftwardly relative to the female seat member, and first interlock balls 198 have now moved radially inwardly to engage interlock slide surface 215. It should also be noted that the male valve element has now completed its rotation to its flow-permitting position, and is restrained from further rotation because male seat member surface 252 now abuts post surface 48. However, such further leftward movement of the male housing relative to the female housing has permitted first interlock balls 198 to move radially inwardly, thereby freeing the female seat member to move axially relative to the female housing. However, in FIG. 8 such motion of the female seat member relative to the female housing has not yet occurred. Thus, when the male and female housings are in the second relative position shown in FIG. 8, the male vale element has completed its clockwise rotation of its flow-permitting position, while the female valve element remains in its flow-preventing position.

With the female seat member now free to move relative to the female housing, the male section may be still further inserted into the female section, to the position shown in FIG. 9. Since the male seat member end face 252 abutted post surface 48 in FIG. 8, such further insertion of the male member causes the now-unrestrained female seat member to move leftwardly relative to its housing. Such relative axial movement between the female valve element and the female housing, causes the female valve element to rotate counterclockwise to its flow-permitting position, aligned with the male valve element. This represents a third relative position between the male and female housings. After the male and female housings are in the position shown in FIG. 9, quick-disconnect sleeve 76 may be released. Spring 88 will then drive this sleeve member rightwardly, forcing quick-disconnect balls 174 to move radially inwardly into locking engagement with male housing groove 248.

To separate the connected male and female coupling sections, the above-described operation is simply reversed. Specifically, referring to FIG. 9, the quick-disconnect sleeve 76 is first moved leftwardly, so as to allow quick-disconnect balls 174 to move radially outwardly against sleeve surface 85. Thereafter, the male section may be withdrawn rightwardly (i.e., axially) from the female section. However, during such initial rightward motion, the male seat member 221 is restrained from axial motion relative to the male housing because second interlock balls 250 are wedged between male housing surface 249, male seat member surface 255, and female housing surface 159. Hence, as the male section is initially withdrawn from the female section, the male valve element remains in its flow-permitting position, and expanding female spring 194 causes the female valve element to move rightwardly relative to the female housing. As such motion continues until the female valve element rotates clockwise from its flow-permitting position (as shown in FIG. 9) back to its flow-preventing position (as shown in FIG. 8).

If the male section is now further withdrawn from the female section, first interlock inclined surface 214 will drive balls 198 radially outwardly into the female housing recess defined by surfaces 170–172. At the same time, male seat member surface 255 will drive second interlock balls radially outwardly. Hence, the female seat member will be locked to the female housing, and the male seat member will be free to move relative to the male housing.

Thus, if the male section is still further withdrawn from the female section, the male seat member may move leftwardly relative to the male housing. This causes the male valve element to rotate counterclockwise toward its flow-preventing position relative to the male housing.

Thereafter, the male section may be further withdrawn from the female section, to the position shown in FIG. 6. During such further withdrawal, expanding male spring 194 has caused the male seat member to move leftwardly relative to the male housing, and has caused the male valve element to continue its rotation to its flow-preventing position. Thereafter, the male section may be simply withdrawn and separated from the female section, as shown in FIG. 5.

MODIFICATIONS

The present invention contemplates that many changes and modifications may be made. The specific form and structure of the two disclosed embodiments, while presently preferred, are only intended to be species examples of what the generic claims are intended to cover.

The shape and configuration of the male and female housings may be readily changed or modified, as desired. The same is true of the valve elements. Other types of valve elements may be substituted for the specific forms shown. Moreover, while a type of a lost-motion eccentric connection is shown between the valve elements and the seat members, this too may be readily changed or modified, all as desired. The particular seals, both as to type and placement, are not deemed critical to the fundamental operation of the invention. Such seals may be of any type, and placed where desired, so as to cause effective sealing between the various relatively-movable parts. In some forms, the bearing members might be eliminated altogether. In the first embodiment, the sequence of valve element rotation is produced by the differential force exerted by springs 113,140. However, in the second embodiment, male and female springs 194,194 are identical, and the operation of this second embodiment does not depend upon such differential spring force. Rather, the proper sequence of valve rotation is caused by the first and second interlock mechanisms of the second embodiment. Moreover, while the two preferred embodiments are shown as being of the quick-disconnect type, such connection may be of other types as well.

Therefore, while two presently-preferred embodiments of the improved coupling device have been shown and described, and some changes and modifications thereof discussed, persons skilled in this art will readily appreciate that various additional changes and modifications may be made without departing from the spirit of the invention, as defined and differentiated by the following claims.

What is claimed is:

1. A fluid coupling device, comprising:
   a first section having a first housing and having a first valve element operatively arranged therein for rotation relative thereto between a flow-preventing position and a flow-permitting position, said first valve element being angularly biased toward said flow-preventing position;
   a second section having a second housing and having a second valve element operatively arranged therein for rotation relative thereto between a flow-preventing position and a flow-permitting position, said second valve element being angularly biased toward said flow-preventing position;
   said sections being selectively movable linearly toward one another between successive first, second and third relative positions between said housings;
   one of said valve elements having a recess arranged to face the other of said valve elements when said housings are in said first relative position;
   the other of said valve elements having a portion arranged within said one valve element recess when said housings are in said first relative position; and
   a sequencing mechanism for first rotating said other valve element from said flow-preventing position to said flow-permitting position when said housings are moved from said first relative position to said second relative position, and for thereafter rotating said one valve element from said flow-preventing position to said flow-permitting position when said housings are further moved from said second relative position to said third relative position, said sequencing mechanism including a first spring operatively arranged to act between said first housing and said first valve element for urging said first valve element to rotate toward its flow-preventing position:
   whereby a full flow passage through said device will be established when said sections are in said third relative position.

2. A fluid coupling device as set forth in claim 1 wherein said first valve element has a through-bore.

3. A fluid coupling device as set forth in claim 2 wherein said first housing has an axis, and wherein said first valve element through-bore is substantially aligned with said first housing axis when said first valve element is in said flow-permitting position.

4. A fluid coupling device as set forth in claim 1 wherein said first valve element has a center, and wherein said first valve element is mounted for rotation about its center.

5. A fluid coupling device as set forth in claim 1 wherein said second valve element has a through-bore.

6. A fluid coupling device as set forth in claim 5 wherein said second housing has an axis, and wherein said second valve element through-bore is substantially aligned with said second housing axis when said second valve element is in its flow-permitting position.

7. A fluid coupling device as set forth in claim 1 wherein said second valve element has a center, and wherein said second valve element is mounted for rotation about its center.

8. A fluid coupling device as set forth in claim 1 wherein each of said housings has an axis, and wherein one of said housings is movable axially relative to the other of said housings when said housings are moved form said first to said third relative positions.

9. A fluid coupling device as set forth in claim 1 wherein said sequencing mechanism includes a second spring operatively arranged to act between said second housing and said second valve element for urging said second valve element to rotate toward its flow-preventing position.

10. A fluid coupling device as set forth in claim 9 wherein each of said springs biases its associated valve element to move toward the other valve element.

11. A fluid coupling device as set forth in claim 9 wherein the force exerted by the one of said first and second springs which acts on said one vlave element is substantially greater than the force exerted by the other of said first and second springs which acts on said other valve element.

12. A fluid coupling device as set forth in claim 9 wherein the force exerted by said first spring on said first valve element is substantially equal to the force exerted by said second spring on said second valve element.

13. A fluid coupling device as set forth in claim 9 wherein at least one of said valve elements is mounted for linear movement relative to the associated housing.

14. A fluid coupling device as set forth in claim 1 and further comprising a first interlock mechanism for preventing said one valve element from rotating when said housings are moved from said first relative position to said second relative position.

15. A fluid coupling device as set forth in claim 1 and further comprising a second interlock mechanism for preventing said other valve element from rotating when said housings are moved from third relative position to said second relative position.

16. A fluid coupling device as set forth in claim 1 and further comprising a connector for selectively preventing said housings from separating when said housings are in said third relative position.

17. A fluid coupling device as set forth in claim 1 wherein said other valve element portion is configured complimentarily to the shape of said first valve element recess.

18. A fluid coupling device as set forth in claim 16 wherein said one valve element recess has a concave surface, wherein said other valve element portion has a convex surface arranged to be received in said one valve element recess in closely-spaced facing relation to said concave recess surface when said housings are in said first relative position so as to minimize the volume of fluid trapped between said first and second sections.

* * * * *